(12) United States Patent
Yoshii et al.

(10) Patent No.: US 10,157,141 B2
(45) Date of Patent: Dec. 18, 2018

(54) MEMORY SYSTEM AND METHOD OF CONTROLLING NONVOLATILE MEMORY

(71) Applicant: TOSHIBA MEMORY CORPORATION, Minato-ku (JP)

(72) Inventors: Kenichiro Yoshii, Bunkyo (JP); Hiroshi Yao, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 15 days.

(21) Appl. No.: 15/254,053

(22) Filed: Sep. 1, 2016

(65) Prior Publication Data
US 2017/0262377 A1    Sep. 14, 2017

Related U.S. Application Data

(60) Provisional application No. 62/305,812, filed on Mar. 9, 2016.

(51) Int. Cl.
| | |
|---|---|
| *G06F 12/00* | (2006.01) |
| *G06F 12/10* | (2016.01) |
| *G06F 3/06* | (2006.01) |
| *G06F 11/10* | (2006.01) |

(52) U.S. Cl.
CPC ........... *G06F 12/10* (2013.01); *G06F 3/0604* (2013.01); *G06F 3/0659* (2013.01); *G06F 3/0673* (2013.01); *G06F 11/1076* (2013.01); *G06F 2212/152* (2013.01); *G06F 2212/403* (2013.01); *G06F 2212/657* (2013.01)

(58) Field of Classification Search
CPC ......... G06F 12/0246; G06F 2212/7211; G06F 2212/1036; G06F 3/0679; G06F 12/10; G06F 2212/2022
See application file for complete search history.

(56) References Cited

U.S. PATENT DOCUMENTS

| | | | |
|---|---|---|---|
| 7,689,762 B2 | 3/2010 | Hobson | |
| 7,853,749 B2 | 12/2010 | Kolokowsky | |
| 8,255,613 B2 | 8/2012 | Abali et al. | |
| 8,407,410 B2 | 3/2013 | Abali et al. | |
| 2010/0281202 A1* | 11/2010 | Abali ................ | G06F 12/0246 711/103 |
| 2012/0311228 A1* | 12/2012 | Hsu .................... | G06F 12/0246 711/102 |
| 2012/0324299 A1* | 12/2012 | Moshayedi ......... | G06F 11/1068 714/710 |
| 2016/0147467 A1 | 5/2016 | Roberts | |
| 2016/0267014 A1* | 9/2016 | Doi .................... | G11C 13/0023 |

FOREIGN PATENT DOCUMENTS

| | | |
|---|---|---|
| JP | 2009-507302 | 2/2009 |
| JP | 2009-75889 | 4/2009 |

* cited by examiner

*Primary Examiner* — Arvind Talukdar
(74) *Attorney, Agent, or Firm* — Oblon, McClelland, Maier & Neustadt, L.L.P.

(57) ABSTRACT

According to one embodiment, when the first command is received from a host, a controller translates a first address designated by a first command into a second address representing a real address of the nonvolatile memory based on a first mapping and accesses the translated second address of the nonvolatile memory. The controller determines whether or not the first mapping is changed based on a degree of wear of the nonvolatile memory and changes some of all the correspondence relations in a case where the first mapping is changed.

18 Claims, 11 Drawing Sheets

| defect RA | substitution RA | Valid flag |
|---|---|---|
| 1023 | Rsub0 | 1 |
| 15 | Rsub1 | 1 |
| N/A | Rsub2 | 0 |
| ⋮ | ⋮ | ⋮ |
|  |  |  |

| defect RA | substitution RA | Valid flag |
|---|---|---|
| 1023 | Rsub0 | 0 |
| 15 | Rsub1 | 1 |
| 1023 | Rsub2 | 1 |
| ⋮ | ⋮ | ⋮ |
|  |  |  |

# MEMORY SYSTEM AND METHOD OF CONTROLLING NONVOLATILE MEMORY

CROSS-REFERENCE TO RELATED APPLICATIONS

This application is based upon and claims the benefit of priority from U.S. Provisional Application No. 62/305,812, filed on Mar. 9, 2016; the entire contents of which are incorporated herein by reference.

FIELD

Embodiments described herein relate generally to a memory system including a nonvolatile memory and a method of controlling a nonvolatile memory.

BACKGROUND

In a case where a correspondence relation between a logical address designated by a host and a real address of a nonvolatile memory is fixed, when accesses are concentrated on a specific logical address, accesses are concentrated on a specific real address of the nonvolatile memory.

DETAILED DESCRIPTION

In general, according to one embodiment, a memory system includes a nonvolatile memory and a controller. The controller translates a first address designated by a first command into a second address representing a real address of the nonvolatile memory based on a first mapping and accesses the translated second address of the nonvolatile memory when the first command is received from a host. The first mapping represents correspondence relations between logical addresses designated by the host and real addresses of the nonvolatile memory. The first command is a write request or a read request. The controller determines whether or not the first mapping is changed based on a degree of wear of the nonvolatile memory and performs a first process in a case where the first mapping is changed. the first process includes changing some correspondence relation among all the correspondence relations.

Exemplary embodiments of a memory system and a method of controlling a nonvolatile memory will be described below in detail with reference to the accompanying drawings. The present invention is not limited to the following embodiments.

(Embodiment)

Figure 1:
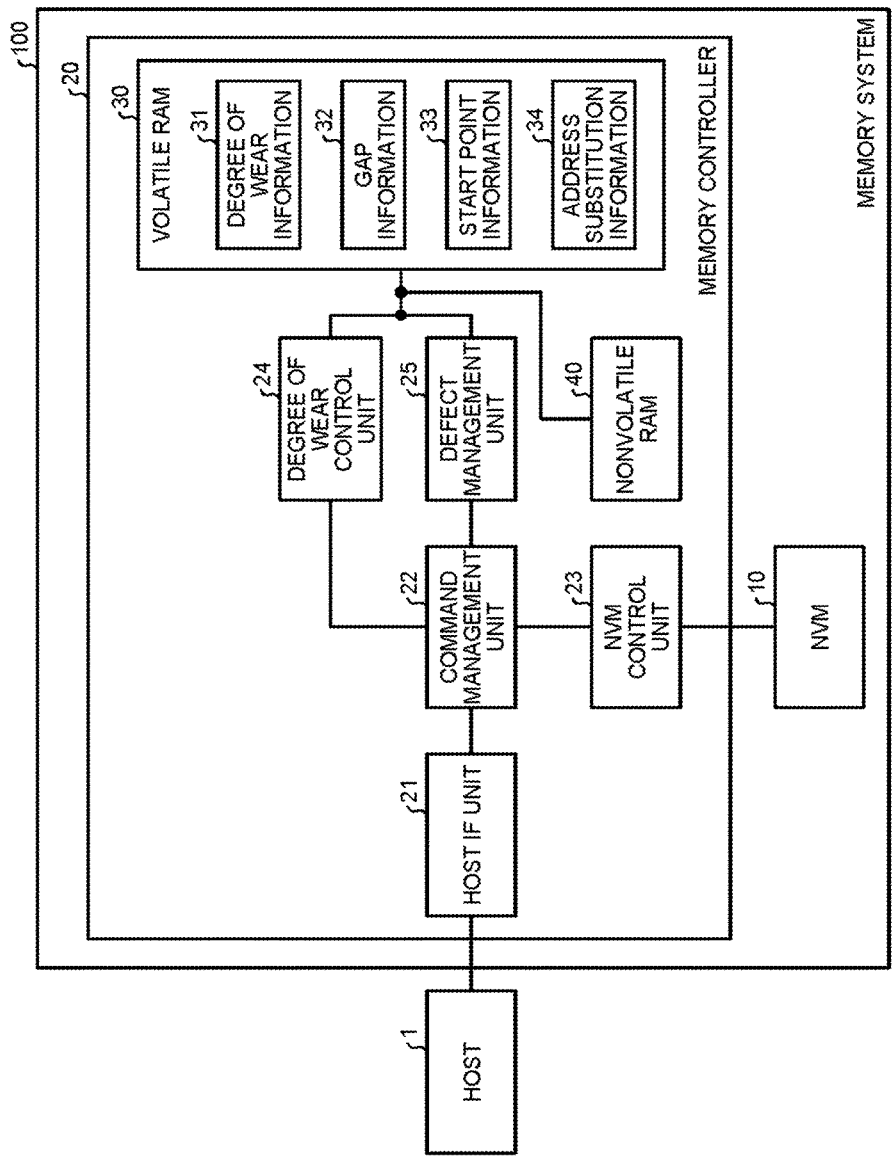
FIG. 1 is a functional block diagram that illustrates an example of the internal configuration of a memory system.

FIG. 1 is a block diagram that illustrates an example of the configuration of a memory system 100 according to an embodiment. The memory system 100 is connected to a host apparatus (hereinafter, abbreviated as a host) 1 through a communication line and functions as an external storage device of the host 1. The host 1, for example, may be an information processing apparatus such as a personal computer, a mobile phone, or an imaging apparatus and may be a mobile terminal such as a tablet computer or a smart phone, a gaming device, or an in-vehicle terminal such as a car navigation system. The host 1 transmits a write request and a read request to the memory system 100.

The memory system 100 includes a nonvolatile semiconductor memory 10 (hereinafter, abbreviated to an NVM) 10 and a memory controller 20. The NVM 10, for example, is a cross-point type memory, a phase change memory (PCM), a magnetoresistive random access memory (MRAM), a resistance random access memory (ReRAM), or a ferroelectric random access memory (FeRAM).

The NVM 10 includes one or a plurality of memory chips each having a memory cell array. One memory chip includes a plurality of pages. A page is a minimum data writing unit. In addition, a page is a minimum data reading unit.

The memory system 100 writes data into the NVM 10 in response to a write request from the host 1. The memory system 100 reads data from the NVM 10 in response to a read request from the host 1.

The memory controller 20 includes: a host IF unit 21; a command management unit 22; an NVM control unit 23; a wear control unit 24; a defect management unit 25; a volatile RAM 30; and a nonvolatile RAM 40. The volatile RAM 30 temporarily stores degree of wear information 31, gap information 32, start point information 33, and address substitution information (address substitution table) 34. The nonvolatile RAM 40 backs up the degree of wear information 31, the gap information 32, the start point information 33, and the address substitution information 34 that are temporarily stored in the volatile RAM 30.

The host IF unit 21 transmits a command (a read request, a write request, or the like) received from the host 1 and user data (write data) to the command management unit 22. In addition, the host IF unit 21 transmits the user data read from the NVM 10, a response of the command management unit 22, and the like to the host 1

The command management unit 22 performs control according to a command received from the host 1 through the host IF unit 21. For example, in a case where a write request is received from the host 1, the command management unit 22 causes the degree of wear control unit 24 and the defect management unit 25 to translate a logical address LA into an real address (physical address) RA and determines the real address RA on the NVM 10 into which write data is to be written. The logical address LA is an address designated by the host 1. As the logical address, for example, logical block addressing (LBA) is used. The real address RA represents a storage position on the NVM 10 in which data is stored. The command management unit 22 outputs the write data received from the host 1 and the real address RA determined as above to the NVM control unit 23.

On the other hand, in a case where a read request is received from the host 1, the command management unit 22 causes the degree of wear control unit 24 and the defect management unit 25 to translate a logical address LA into an real address RA and determines the real address RA on the NVM 10 from which data is to be read. The command management unit 22 outputs the real address RA determined as above to the NVM control unit 23.

The NVM control unit 23 accesses the NVM 10 based on an access type (identification of one of read and write) input from the command management unit 22 and the real address RA and performs read control or write control for the NVM 10. When the process for the NVM 10 is completed, the NVM control unit 23 outputs a completion report including whether or not the process is successful to the command management unit 22. The NVM control unit 23 may include an error correcting code (ECC) circuit. The ECC circuit performs error correcting coding processing for data transmitted from the command management unit 22, thereby generating parity. The ECC circuit outputs a code word including data and parity to the NVM 10. The ECC circuit performs an error correcting decoding process using the code word read from the NVM 10 and transmits decoded data to the command management unit 22.

The degree of wear control unit 24 manages a mapping representing a correspondence relation between the logical address LA and the real address RA and performs an address solving process translating a logical address LA input from the host 1 into a physical address RA on the NVM 10. In addition, when a read request or a write request is received from the host 1, the degree of wear control unit 24 determines whether or not a condition for changing the mapping has been satisfied based on the degree of wear of the NVM 10 and changes the mapping in a case where the condition for changing the mapping is satisfied. At the time of changing the mapping, the degree of wear control unit 24 changes some of all the mappings instead of changing all the mappings once so as not to cause the mapping process to be concentrated at one time. In addition, when a read request or a write request is received from the host 1, by performing the mapping changing process described above, the mapping changing process can be efficiently performed without arranging specific changing timing.

Figure 2:
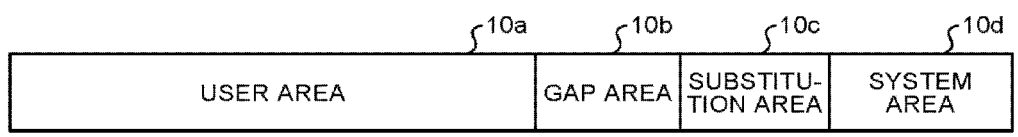
FIG. 2 is a diagram that illustrates a plurality of areas included in a nonvolatile memory.

FIG. 2 is a diagram that conceptually illustrates a storage area of the NVM 10. The NVM 10 includes: a user area 10a and a gap area 10b in which user data can be stored; a substitution area 10c including a substitution page with which a defective page included in the user area 10a and the gap area 10b is substituted; and a system area 10d in which system information is stored. The user area 10a, the gap area 10b, and the substitution area 10c can store user data. The system area 10d can store management information and system information of memory system 100.

The user area 10a is configured by a plurality of pages associated with logical addresses LA. The gap area 10b is configured by a plurality of pages not associated with logical addresses LA. The gap area 10b is an area that is temporarily not used for storing data. The gap area 10b is an area for which a data writing process or a data reading process is temporarily suspended. By changing the mapping, some pages belonging to the gap area 10b belong to the user area 10a, and some pages belonging to the user area 10a belong to the gap area 10b. In other words, the mapping is changed by using the user area 10a and the gap area 10b.

Figure 3:
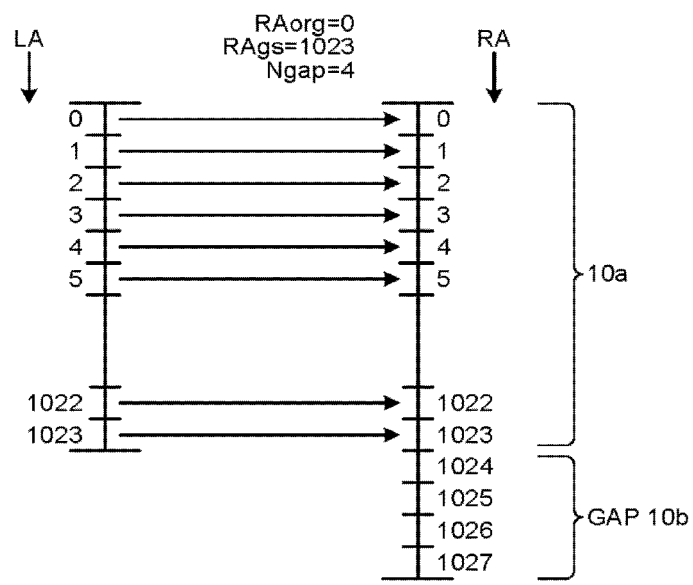
FIG. 3 is a diagram that illustrates an example of a correspondence relation between a logical address and an actual area of a nonvolatile memory in an initial stage.

FIG. 3 is a diagram that illustrates a correspondence relation between a logical address LA and a real address RA. FIG. 3 illustrates an example of mapping that is in an initial stage before the change of the mapping. A left straight line represents a logical address space, and a right straight line represents a real address space. Each number attached to the right straight line represents a page number. Each number attached to the left line represents a logical address LA corresponding to a page size. Each arrow from the left straight line toward the right straight line represents association between a logical address LA and a real address RA. In the case illustrated in FIG. 3, an area of RA=0 to RA=1023 is mapped into logical addresses LA and corresponds to the user area 10a illustrated in FIG. 2. In the case illustrated in FIG. 3, an area of RA=1024 to RA=1027 corresponds to the gap area 10b illustrated in FIG. 2.

In the real address space, in order to define the user area 10a and the gap area 10b, the following parameters are used. Nra is a sum of the storage capacity (the number of pages) of the user area 10a and the storage capacity (the number of pages) of the gap area 10b. In the case illustrated in FIG. 3, Nra=1024+4=1028 pages. Ngap is the storage capacity (the number of pages) of the gap area 10b. In the case illustrated in FIG. 3, Ngap=4 pages. A start point RAorg is a start point address used for performing address translation using an address translation equation to be described later. In an initial stage illustrated in FIG. 3, the start point RAorg is a real address (RA=0) associated with a logical address LA of LA=0, and RAorg=0. A start point RAgs is a start point address of the gap area 10b. In the case illustrated in FIG. 3, RAgs=1024. Start point information 33 includes the start point RAorg. Gap information 32 includes the start point RAgs.

The volatile RAM 30 is a volatile semiconductor memory that can be accessed at a speed higher than the access speed of the NVM 10. The volatile RAM 30 may be arranged outside a chip configuring the memory controller 20. The volatile RAM 30, for example, is a static random access memory (SRAM) or a dynamic random access memory (DRAM). The volatile RAM 30 stores the degree of wear information 31, the gap information 32, the start point information 33, and the address substitution information 34.

While reading and updating the degree of wear information 31, the gap information 32, and the start point information 33 stored in the volatile RAM 30, the degree of wear control unit 24 performs the translation process (address solving process) from a logical address LA into a physical address RA and the mapping changing process, and the like.

The degree of wear information 31 is information that represents the degree of wear of the NVM 10. As described above, the mapping changing process is triggered upon the degree of wear information. The degree of wear of the NVM 10 changes according to an access type, an access size, and an access interval for the NVM 10, the temperature of the NVM 10, and the like. In this embodiment, the degree of wear of the NVM 10 is managed in units of memory chips. For example, a case will be described in which the number of times of programming (the number of times of writing) is used as a parameter for managing the degree of wear of each chip. The number of times of writing, for example, is calculated based on the number of times of writing for one or a plurality of pages included in a chip. In order to calculate the number of times of writing for a chip, the number of times of writing for all the pages included in the chip may be acquired. In addition, the number of times of writing may be calculated based on the number of times of writing for specific one or a plurality of pages selected in advance as a sampling target. For example, the numbers of times of writing for a plurality of pages that are sampling targets are acquired, and an average value or a maximum value thereof is set as the number of times of writing for the chip.

The degree of wear control unit 24 determines whether or not a mapping change condition is satisfied based on the number of times of writing for the chip. For example, in a case where the number of times of writing for a chip is increased by a certain value $\Delta w$, the degree of wear control unit 24 determines that the mapping change condition is satisfied. In other words, when the number of times of writing for the chip is increased by the certain value $\Delta w$, the mapping is changed. In order to perform such control, a difference between the number of times of writing for the chip at the previous time of performing the mapping changing process and the current number of times of writing for the chip is acquired, and, when the difference exceeds a certain threshold, the mapping change condition is determined to be satisfied.

The degree of wear for a chip may be determined using the number of times of reading in place of the number of times of writing described above. Alternatively, the degree of wear may be determined using the number of times of writing described above and the number of times of reading. In addition, a current environmental temperature may be measured, and the measured temperature may be added as a determination factor of the degree of wear for the chip. Furthermore, the access size described above may be added as a determination factor of the degree of wear for a chip. The degree of wear may be determined in units of NVMs 10 in place of in units of chips. In a case where the degree of wear is determined in units of NVMs 10, a time may be used as a parameter for managing the degree of wear. For example, it may be configured such that an elapsed operating time from the first startup of the memory system 100 is counted, and the mapping may be changed for every time when a count value is increased by a certain value $\Delta g$. In addition, the mapping may be changed when access destinations requested from the host 1 are concentrated on a certain area of the user area 10a of the NVM 10.

The gap information 32 stored in the volatile RAM 30, as described above includes the start point RAgs that is a start point address of the gap area 10b. The start point information 33 stored in the volatile RAM 30 includes the start point RAorg described above. The gap information 32 and the start point information 33 are updated when the mapping is changed.

Figures 4, 5:
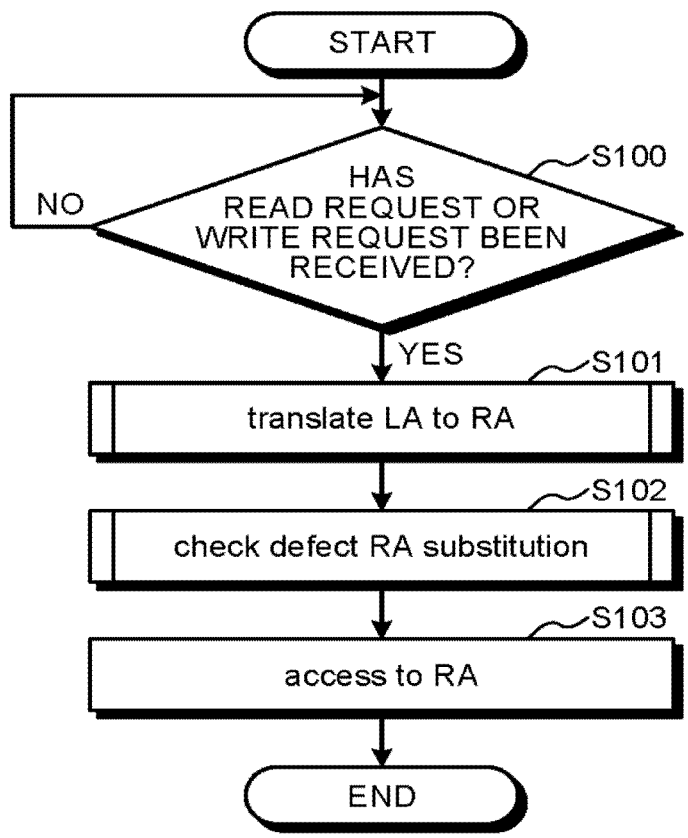
FIG. 4 is a diagram that illustrates an example of an address substitution table.
FIG. 5 is a flowchart that illustrates an example of the overall operation of a memory system that is performed when a read request or a write request is received.

The defect management unit 25 manages defective pages included in the user area 10a and the gap area 10b by using the address substitution information 34 stored in the volatile RAM 30. A defective page is an unusable page that does not normally operate due to various reasons. FIG. 4 is a diagram that illustrates an example of the address substitution information 34. As illustrated in FIG. 4, in one entry, a real address (defect RA) of a defective page, a real address (substitution RA) of a substitution page, and a valid flag are recorded as a set. The valid flag represents whether or not a corresponding entry is valid. When the entry is valid, the valid flag is set to one. On the other hand, when the entry is not valid, the valid flag is set to zero.

The nonvolatile RAM 40 is a memory used for regularly storing the degree of wear information 31, the gap information 32, the start point information 33, and the address substitution information 34 that are temporarily stored in the volatile RAM 30 to be nonvolatile at certain timing for backing up the information. The nonvolatile RAM 40, for example, is configured by a magnetoresistive random access memory (MRAM), a resistance random access memory (ReRAM), a ferroelectric random access memory (FeRAM), or the like. The nonvolatile RAM 40 may be arranged outside the chip configuring the memory controller 20.

In addition, by configuring the nonvolatile RAM 40 not to be present, the degree of wear information 31, the gap information 32, the start point information 33, and the address substitution information 34 that are temporarily stored in the volatile RAM 30 may be backed up into the system area 10d of the NVM 10. Furthermore, by configuring the volatile RAM 30 not to be present, the degree of wear information 31, the gap information 32, the start point information 33, and the address substitution information 34 may be directly updated and managed in the nonvolatile RAM 40.

Hereinafter, the operation sequence of the memory system 100 will be described with reference to flowcharts illustrated in FIGS. 5 to 10. FIG. 5 is a flowchart that illustrates the overall operation sequence of the memory system 100 that is performed when a read request or a write request is received from the host 1. When a command is received from the host 1, the host IF unit 21 transmits the received command to the command management unit 22. The command management unit 22 determines whether the received command is a read request or a write request (S100). In a case where the received command is the read request or the write request, the command management unit 22 notifies a logical address LA designated by the command to the degree of wear control unit 24. The degree of wear control unit 24 translates the received logical address LA into a real address (physical address) RA of the NVM 10 based on the degree of wear information 31, the gap information 32, and the start point information 33 and a certain calculation equation (S101). The logical/physical translation process of Step S101 includes the mapping changing process as well. The degree of wear control unit 24 notifies the translated real address RA to the command management unit 22.

When the translation from the logical address LA into a real address RA is completed, the command management unit 22 notifies the real address RA to the defect management unit 25. The defect management unit 25 checks whether a page corresponding to the notified real address RA is a defective page based on the address substitution information 34 (S102). In a case where the notified real address RA is defective, the defect management unit 25 substitutes the real address to be substituted with the notified real address. On the other hand, in a case where the notified real address is not defective, the original real address is used as it is. The defect management unit 25 notifies the real address RA acquired through the defect checking process to the command management unit 22.

The command management unit 22 transmits the real address RA notified from the defect management unit 25 and the access type (an identification of one of read and write) to the NVM control unit 23, thereby requesting an access to the NVM 10. The NVM control unit 23 accesses the NVM 10 based on the real address RA and the access type that are transmitted (S103).

Figure 6:
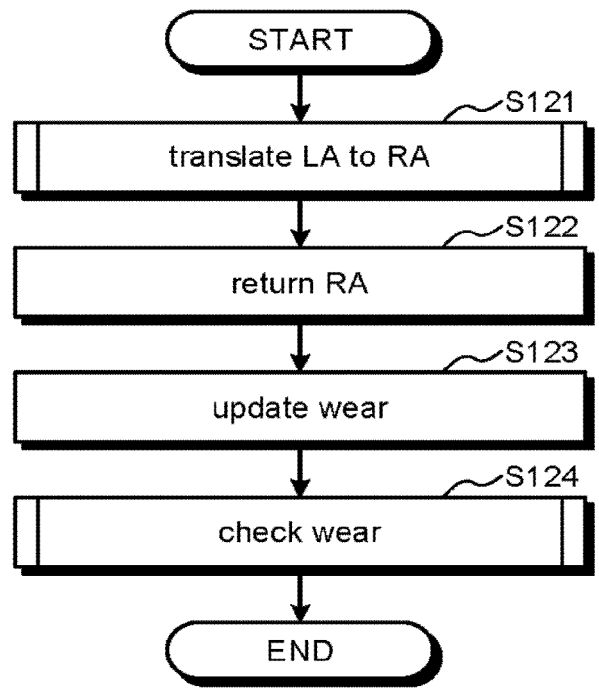
FIG. 6 is a flowchart that illustrates an example of the operation sequence of an address translation process.
Figure 7:
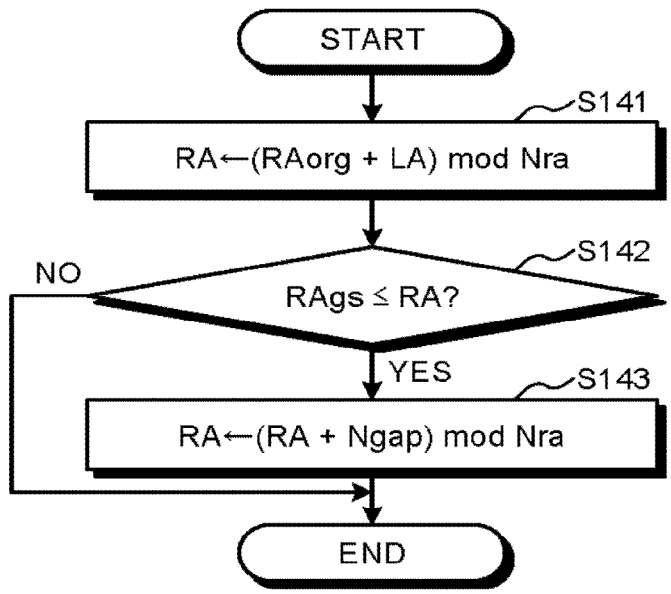
FIG. 7 is a flowchart that illustrates an example of a detailed sequence of an address solving process.

FIG. 6 is a flowchart that illustrates the detailed sequence of S101 illustrated in FIG. 5. The degree of wear control unit 24 translates the received logical address LA into a real address RA of the NVM 10 based on the degree of wear information 31, the gap information 32, and the start point information 33 and a certain calculation equation (FIG. 6: S121). FIG. 7 is a flowchart that illustrates the detailed sequence of Step S121. First, the degree of wear control unit 24 acquires a temporary translation result (RA) by using the following Equation (1).

$$RA = (RAorg + LA) \bmod Nra \quad (1)$$

In other words, the degree of wear control unit 24 adds the logical address LA notified from the command management unit 22 and the start point RAorg, divides a result of the addition by the total number of pages Nra, and sets a remainder thereof as a translation result RA (S141).

Next, the degree of wear control unit 24 compares a result of the calculation acquired in S141 with the start point RAgs (S142). As a result of the comparison, in a case where RA≥RAgs (S142: Yes), the degree of wear control unit 24 acquires a final translation result (RA) by using the following Equation (2).

$$RA = (RA + Ngap) \bmod Nra \quad (2)$$

In other words, the degree of wear control unit 24 adds the calculation result RA of Step S141 and the number of pages Ngap of the gap area, divides a result of the addition by a total number of pages Nra, and a remainder thereof is set as a final translation result RA (S143). On the other hand, in a case where RA<RAgs (S142: No) in Step S142, a calculation result of S141 is set as a final translation result RA.

A specific example of a logical/physical translation performed when the mapping illustrated in FIG. 3 is registered will be described. At this time, Nra=1028, RAorg=0, RAgs=1024, and Ngap=4. A case will be described in which a logical/physical translation of a logical address LA=1022 is performed. The calculation equation of Step S141 is (0+1022) mod 1028, and a result of the calculation is 1022. At this time, since RAgs=1024, RA=1022, and a result of the determination of Step S142 is "No", a final translation result RA=1022.

Figure 11:
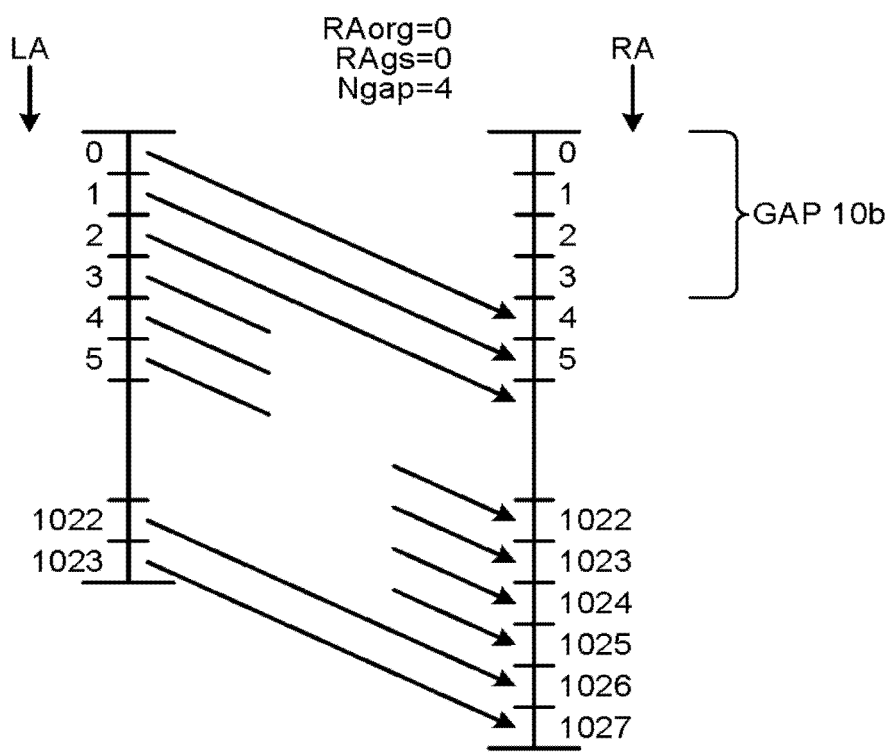
FIG. 11 is a diagram that illustrates an example of a correspondence relation between a logical address and an actual area of a nonvolatile memory when a mapping is changed.

FIG. 11 is a diagram that illustrates an example of a state in which the mapping that is in the initial stage illustrated in FIG. 3 is changed. In the case illustrated in FIG. 11, an area of RA=0 to RA=3 corresponds to the GAP area, and an area of RA=4 to RA=1027 corresponds to the user area. At this time, Nra=1028, RAorg=0, RAgs=0, and Ngap=4. A case will be described in which a logical/physical translation of a logical address LA=1022 is performed. The calculation equation of Step S141 is (0+1022) mod 1028, and a result of the calculation is 1022. At this time, since RAgs=0 and RA=1022, and a result of the determination of Step S142 is Yes, the calculation of Step S143 is performed. The calculation equation of Step S143 is (1022+4) mod 1028, and a result of the calculation is 1026. A final translation result RA=1026.

Next, the degree of wear control unit 24 notifies the real address RA calculated by the process illustrated in FIG. 7 to the command management unit 22 (FIG. 6: S122). Next, the degree of wear control unit 24 updates the degree of wear information 31 (S123). For example, in a case where the parameter for managing the degree of wear is the number of times of writing, the number of times of writing is updated before actually accessing the NVM 10. Next, the degree of wear control unit 24 performs a degree of wear checking process by using the updated degree of wear (S124).

Figure 8:
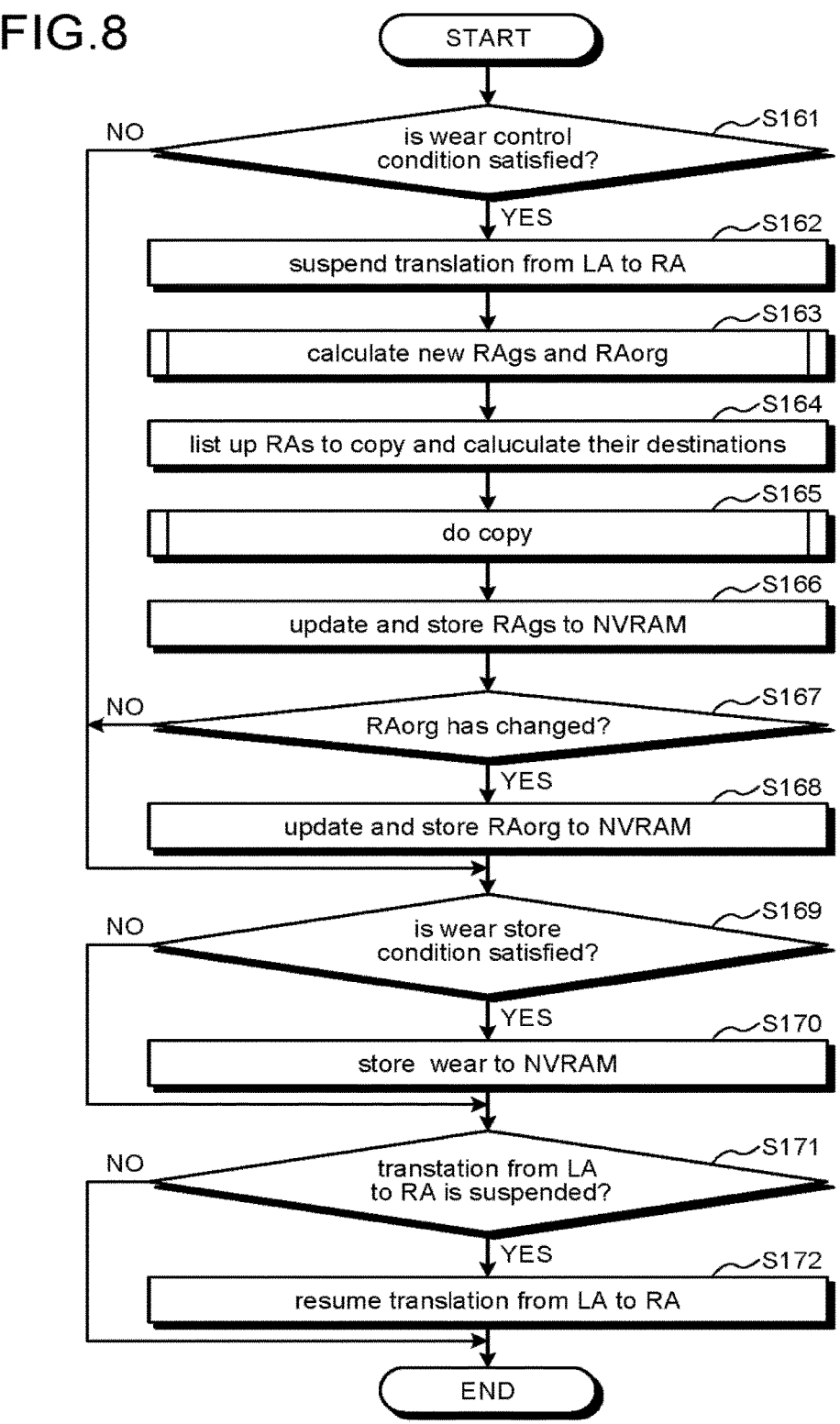
FIG. 8 is a flowchart that illustrates an example of an operation sequence of a degree of wear checking process.

FIG. 8 is a flowchart that illustrates the detailed sequence of the degree of wear checking process illustrated in Step S124 of FIG. 6. First, the degree of wear control unit 24 determines whether or not a condition for performing the degree of wear controlling process, in other words, the mapping changing process is satisfied by referring to the degree of wear information 31 updated in Step S123 illustrated in FIG. 6 (S161). For example, as described above, it is determined whether or not the condition is satisfied by comparing the number of times of writing with a threshold. In a case where the mapping changing process is not necessary, the degree of wear control unit 24 causes the process to proceed to Step S169. On the other hand, in a case where the mapping changing process is necessary, the degree of wear control unit 24 temporarily suspends a logical/physical translation process for a next logical address LA that is notified from the command management unit 22 (S162). Next, the degree of wear control unit 24 performs the mapping changing process (S163).

Figure 9:
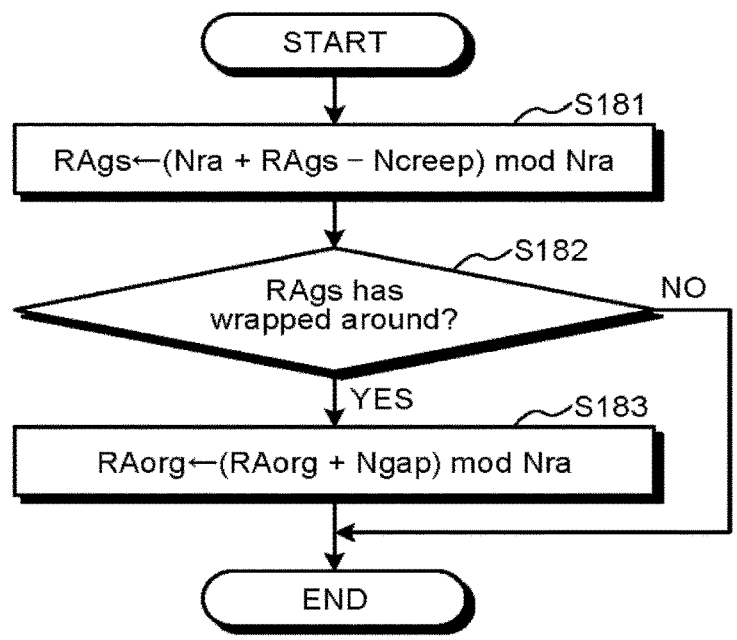
FIG. 9 is a flowchart that illustrates an example of the detailed sequence of a mapping changing process.

FIG. 9 is a flowchart that illustrates the detailed sequence of the mapping changing process illustrated in S163 of FIG. 8. The mapping changing process, more specifically, is a process of changing two start points RAorg and RAgs included in Translation Equation (1) and Translation Equation (2). A value Ncreep represents the number of areas (the number of pages) by which the mapping is moved in the degree of wear controlling process of one time. The degree of wear control unit 24 calculates the start point RAgs of the gap area 10b based on the following equation (3).

$$RAgs = (Nra + RAgs - Ncreep) \bmod Nra \quad (3)$$

In other words, the degree of wear control unit 24 adds the total number of pages Nra and the start point RAgs of the current gap area 10b, subtracts the value Ncreep from a result of the addition, divides a result of the calculation by the total number of pages Nra, and sets a remainder thereof as the start point RAgs of a new gap area 10b (S181).

Next, the degree of wear control unit 24 determines whether or not the start point RAgs is wrapped around based on the calculation of Step S181 (S182). In a case where the start point RAgs is wrapped around (S182: Yes), a new start point RAorg is calculated using the following Equation (4).

$$RAorg = (RAorg + Ngap) \bmod Nra \quad (4)$$

In other words, the degree of wear control unit 24 adds the current start point RAorg and the number of pages Ngap of the gap area, divides a result of the addition by the total number of pages Nra, and sets a remainder thereof as a new start point RAorg (S183). On the other hand, in a case where the start point RAgs is not wrapped around, the degree of wear control unit 24 does not change the start point RAorg (S182: No).

In this way, in the mapping changing process illustrated in FIG. 9, in a case where the start point RAgs is determined not to be wrapped around based on the calculation of Step S181, one start point RAgs is updated with a value acquired by the calculation of Step S181, but the other start point RAorg is not updated. On the other hand, in a case where the start point RAgs is determined to be wrapped around based on the calculation of Step S181, one start point RAgs is updated based on the calculation of Step S181, and the other start point RAorg is updated based on the calculation of Step S183.

Figure 12:
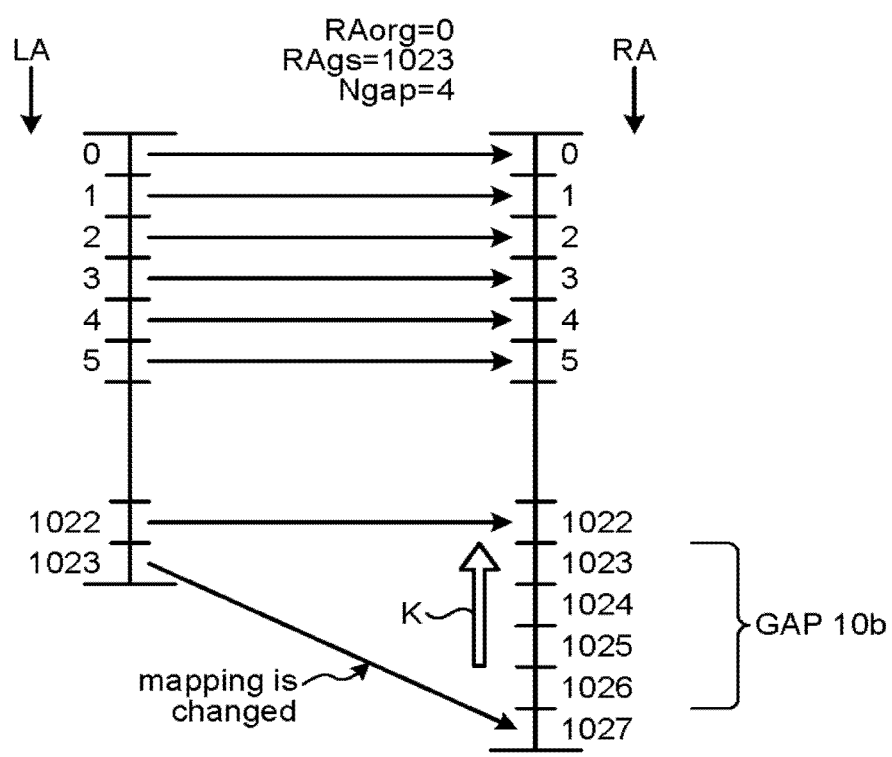
FIG. 12 is a diagram that illustrates an example of a correspondence relation between a logical address and an actual area of a nonvolatile memory when a mapping is changed.

FIG. 12 is a diagram that illustrates an example in which the mapping illustrated in FIG. 3 is changed by the process illustrated in FIG. 9. As illustrated in FIG. 3, in the old mapping, RAorg=0, RAgs=1024, and Ngap=4. In addition, Nra=1028. Furthermore, the value Ncreep=1. An arrow K represents a direction in which the gap area 10b creeps. The translation equation of Step S181 illustrated in FIG. 9 is (1028+1024−1) mod 1028, and a result of the calculation is 1023. At this time, since the start point RAgs is not wrapped around, a result of the determination of Step S182 is No, and a new start point RAgs=1023. In addition, the start point RAorg is not changed, and RAorg=0.

In the case illustrated in FIG. 12, the gap area 10b is changed from RA=1023 to include RA=1026, and a logical address LA=1023 is associated with a real address RA=1027. In a case where the changed start point RAgs=1023, the start point RAorg that is not changed as RAorg=0, and the logical address LA=1023 are substituted into Translation Equations (1) and (2) illustrated in FIG. 7, Translation equation (2) is selected, and a real address RA corresponding to the logical address LA=1023 is RA=1027.

Figure 13:
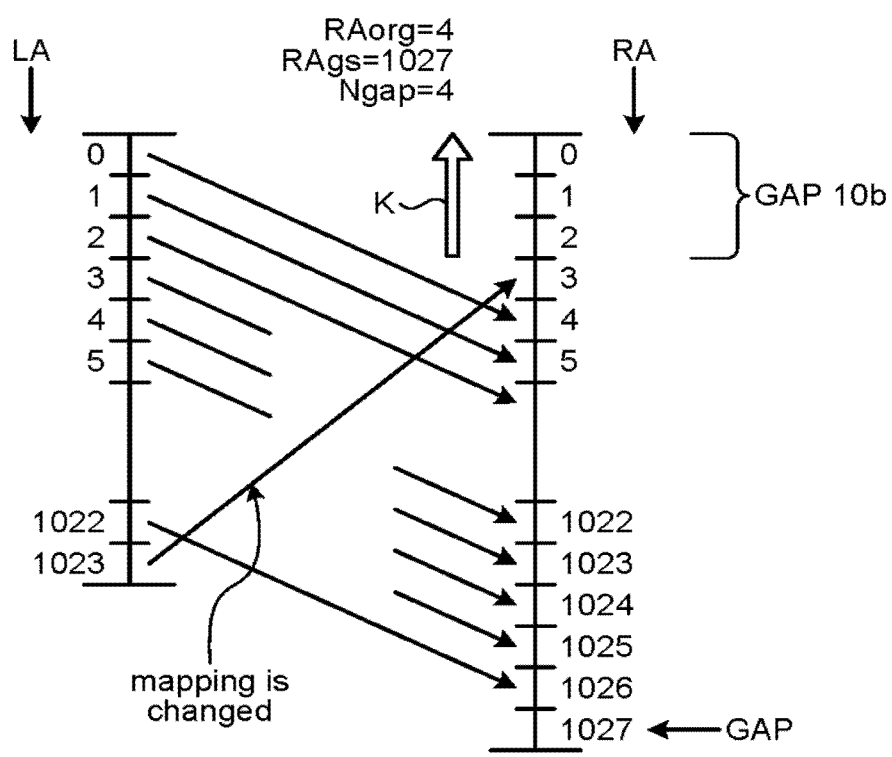
FIG. 13 is a diagram that illustrates an example of a correspondence relation between a logical address and an actual area of a nonvolatile memory when a mapping is changed.

FIG. 13 is a diagram that illustrates an example in which the mapping illustrated in FIG. 11 is changed by the process illustrated in FIG. 9. As illustrated in FIG. 11, in the old mapping, RAorg=0, RAgs=0, and Ngap=4. In addition, Nra=1028. Furthermore, the value Ncreep=1. The translation equation of Step S181 illustrated in FIG. 9 is (1028+0−1) mod 1028, and a result of the calculation is 1027. Accordingly, a new start point RAgs=1027. At this time, since the start point RAgs is changed from 0 to 1027 and is wrapped around, a result of the determination of Step S182 is Yes. The translation equation of Step S183 illustrated in FIG. 9 is (0+4) mod 1028, and a result of the calculation is 4. Accordingly, a new start point RAorg=4.

In the case illustrated in FIG. 13, the gap area 10b is changed from RA=1027 to include RA=2, and a logical address LA=1023 is associated with a real address RA=3. In a case where the changed start point RAgs=1027, the changed start point RAorg=4, and the logical address LA=1023 are substituted into Translation Equations (1) and (2) illustrated in FIG. 7, Translation equation (2) is selected, and a real address RA corresponding to the logical address LA=1023 is RA=3.

Figure 10:
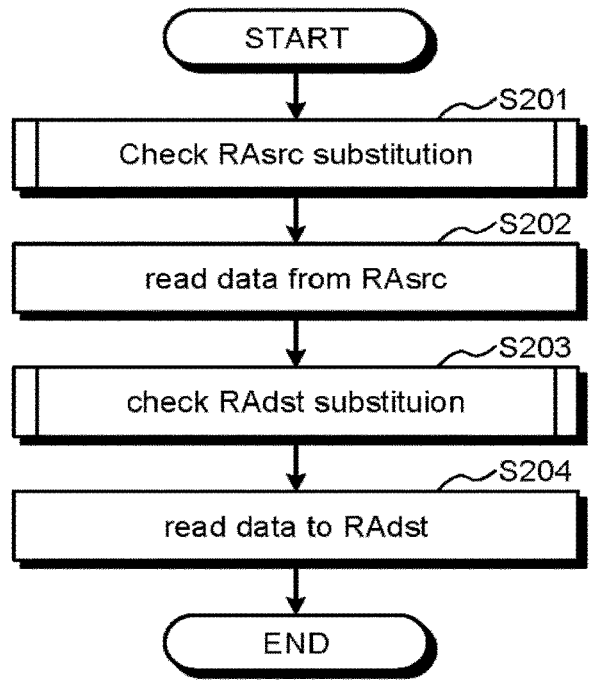
FIG. 10 is a flowchart that illustrates an example of the detailed sequence of an address substituting process.

Next, the degree of wear control unit 24 lists up a logical address LA of which a correspondence relation between the logical address LA and a real address RA has been changed by the mapping changing process described above (S164) and copies data recorded at a real address RAsrc before the change to a real address RAdst of a changed destination (S165). FIG. 10 is a flowchart that illustrates the detailed sequence of the copy process illustrated in Step S165 of FIG. 8. The degree of wear control unit 24 performs defect checking of the real address RAsrc of the copy source and determines the real address RAsrc of the copy source to be final (S201). In other words, the degree of wear control unit 24 determines whether or not the real address RAsrc of the copy source is registered in the address substitution information 34 by referring to the address substitution information 34. In a case where the real address RAsrc of the copy source is not registered, the degree of wear control unit 24 uses the real address RAsrc of the copy source as it is. On the other hand, in a case where the real address RAsrc of the copy source is registered, the degree of wear control unit 24 acquires a substitution address and sets the substitution address as the real address RAsrc of the copy source. The degree of wear control unit 24 reads data from the real address RAsrc of the copy source of the NVM 10 (S202).

The degree of wear control unit 24 performs similar defect checking for the real address RAdst of the copy destination and determines the real address RAdst of the copy destination to be final (S203). The degree of wear control unit 24 writes the data read from the real address RAsrc of the copy source of the NVM 10 into the real address RAdst of the copy destination of the NVM 10 (S204).

When the copy process is completed, the degree of wear control unit 24 updates the gap information 32 (start point RAgs) of the volatile RAM 30 using the start point RAgs changed by the mapping changing process and further updates also the start point RAgs backed up in the nonvolatile RAN (NVRAM) 40 (S166). Next, the degree of wear control unit 24 checks whether or not the start point RAorg has been changed by the process of Step S183 illustrated in FIG. 9 (S167). In a case where the start point RAorg has not been changed, the process proceeds to Step S169. On the other hand, in a case where the start point RAorg has been changed, the degree of wear control unit 24 updates the start point information 33 (start point RAorg) of the volatile RAM 30 and further updates also the start point RAorg backed up in the nonvolatile RAM (NVRAM) 40 (S168).

Next, the degree of wear control unit 24 determines whether or not a condition for storing the degree of wear information 31 updated in Step S123 illustrated in FIG. 6 in the nonvolatile RAM (NVRAM) 40 is satisfied (S169). For example, when a read request or a write request is received for a plurality of certain number of times Nd, the condition described above is determined to be satisfied. In addition, for example, an operating time from the first operating of the memory system 100 is counted, and, every time when this count value is increased by a certain value $\Delta g$, the condition described above may be determined to be satisfied. In a case where the condition described above is satisfied, the degree of wear control unit 24, stores the degree of wear information 31 updated in Step S123 of FIG. 6 in the nonvolatile RAM (NVRAM) 40 (S170). On the other hand, in a case where the condition described above is not satisfied, the degree of wear control unit 24 causes the process to proceed to Step S171.

Next, the degree of wear control unit 24 determines whether or not the logical/physical translation process is suspended in Step S162 (S171). In a case where the logical/physical process is suspended, the degree of wear control unit 24 resumes the logical/physical translation process (S172). On the other hand, in a case where the logical/physical translation process is not suspended (S171: No), the degree of wear control unit 24 completes the process.

Figure 14:
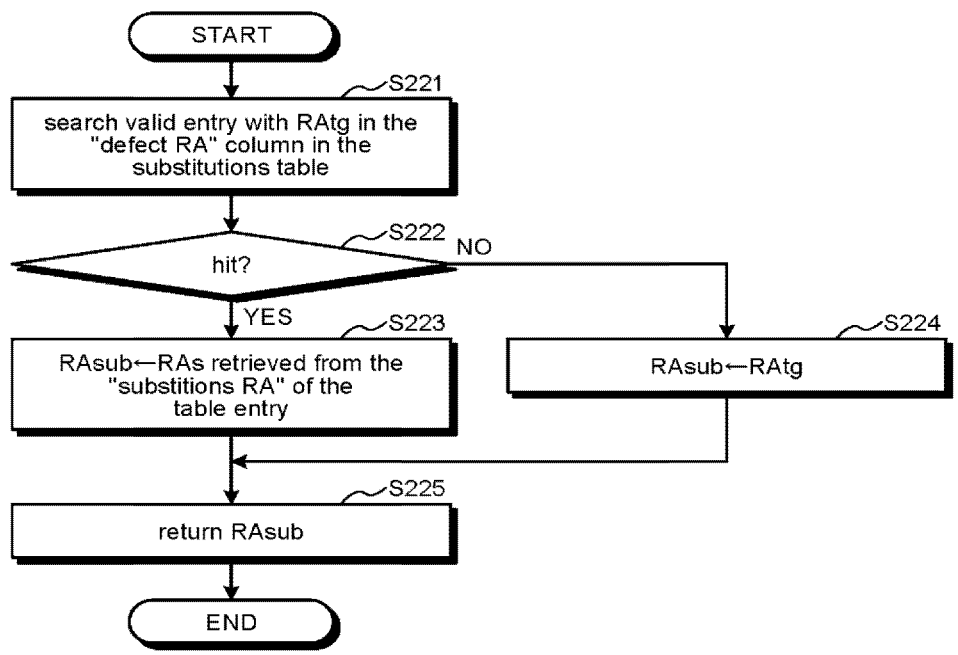
FIG. 14 is a flowchart that illustrates an example of the detailed sequence of an address substituting process using an address substitution table.

Next, the defective page substituting process of Step S102 illustrated in FIG. 5 will be described. The defect management unit 25 performs a process of substituting a defective page with a substitution page by using the address substitution table 34 illustrated in FIG. 4. First, an address substituting process will be described with reference to a flowchart illustrated in FIG. 14. The defect management unit 25 searches each entry included inside the address substitution table 34 illustrated in FIG. 4 by using a checking target address RAtg input from the command management unit 22 as the key and determines whether or not there is a valid entry having Valid flag=1 in which the address RAtg is registered (S221). In a case where the search is missed (S222: No), since the address RAtg that is the checking target is not registered in the address substitution table 34, the defect management unit 25 sets the real address RAtg that is the checking target as a real address RAsub of a processing result (S224). On the other hand, in a case where the search is hit (S222: Yes), the defect management unit 25 sets a real address RAs acquired from a substitution RA column of a hit entry as a real address RAsub of the processing result (S223). The defect management unit 25 returns the real address RAsub that is the processing result to the command management unit 22 (S225).

When the address substitution table 34 is in the state illustrated in FIG. 4, RA=1023 and RA=15 are registered as defect addresses. When RAtg=1023 is input, RAsub=Rsub0 is output. When RAtg=15 is input, RAsub=Rsub1 is output. On the other hand, when an address other than RA=1023 or RA=15 is input, a reply is made using the input address RAtg.

Figures 15, 16:
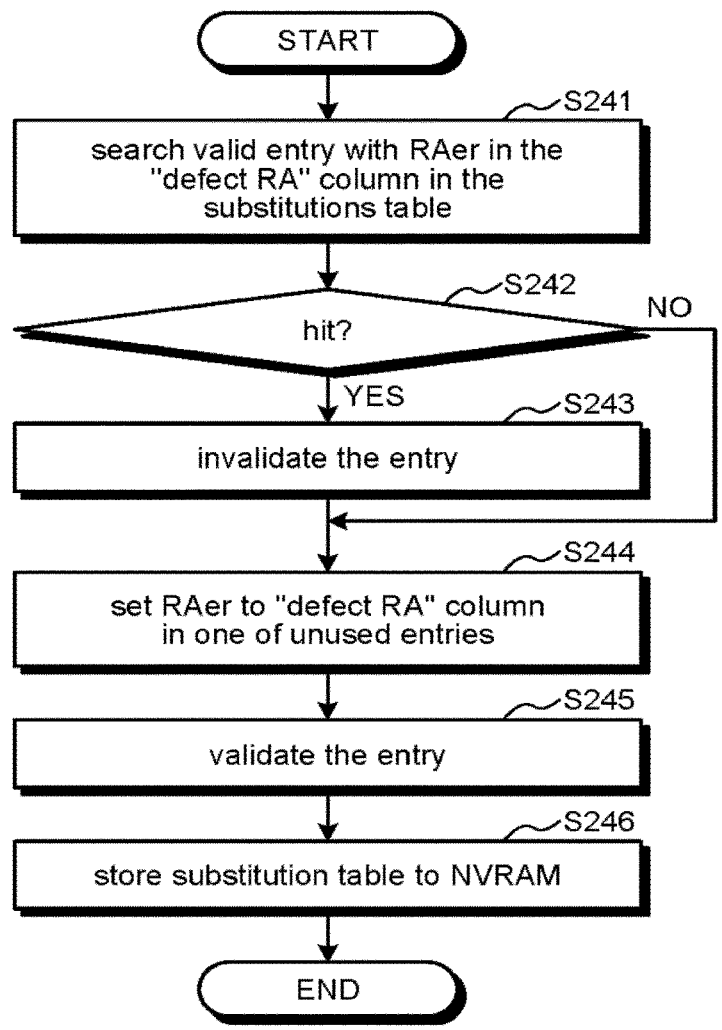
FIG. 15 is a flowchart that illustrates an example of the sequence of registering a new address in an address substitution table.
FIG. 16 is a diagram that illustrates an example of an address substitution table at the time of registering a new address.

Next, a registration process for registering a new defect address RAer and a substitution address RA will be described with reference to a flowchart illustrated in FIG. 15. The defect management unit 25 searches entries included inside the address substitution table 34 illustrated in FIG. 4 by using a new defect address RAer to be registered as the key and determines whether or not there is a valid entry having Valid flag=1 in which an address coinciding with the address RAer is registered (S241). In a case where the search is hit (S242: Yes), the defect management unit 25 sets the valid flag of the hit entry as Valid flag=0, thereby invalidating the entry (S243). The defect management unit 25 registers a new defect address RAer in a field of "defect RA" of an unused entry (S244) and sets the valid flag of the entry to "1", thereby validating the entry (S245). Next, the defect management unit 25 stores the substitution table 34 in which the new defect address is registered in the nonvolatile RAM (NVRAM) 40, thereby configuring the substitution table to be nonvolatile (S246).

For example, when the address substitution table 34 is in the state illustrated in FIG. 4, when RAer=1023 as a new defect address RAer and Substitution RA=Rsub2 as a substitution RA are registered, an entry having RAer=1023 is already present, and accordingly, the valid flag of an old entry disposed in an uppermost stage is set to Valid flag=0 and is regarded to be invalid. Then, the new defect address RAer and the substitution address RA are registered in an unused entry. FIG. 16 illustrates the state of the address substitution table 34 after the registration.

In this way, according to this embodiment, when a read request or a write request is received from the host 1, some mappings are changed. Accordingly, the mapping changing process can be efficiently performed without causing mapping processes to be concentrated on one time. In addition, also when accesses are concentrated on a specific logical address, there is no concentration on a specific real address. In addition, since the start point addresses RAorg and RAgs and the degree of wear are regularly stored to be nonvolatile, also when unexpected power shutdown occurs, the mapping changing process can be continued.

In the embodiment described above, while the mapping is changed in the unit of one page, the mapping may be changed in the unit of a plurality of pages. In addition, the number of times of changing the start point address RAorg and the number of times of changing the start point address RAgs may be managed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising: a first nonvolatile memory, the first nonvolatile memory including a first area associated with logical addresses designated by a host and a second area not associated with the logical addresses; and a second nonvolatile memory that is a device different from the first nonvolatile memory, a controller configured to: when a first command is received from the host, translate a first address into a second address based on a first mapping, the first address being designated by the first command, the second address representing a real address of the first nonvolatile memory, the first mapping representing correspondence relations between the logical addresses and real addresses of the first nonvolatile memory, the first command being a write request or a read request; determine whether or not the first mapping is changed based on a degree of wear of the first nonvolatile memory and perform a first process in a case where the first mapping is changed, the first process including validating mapping between some real addresses among the real addresses included in the second area and the logical addresses from being invalid and invalidating mapping between some real addresses among the real addresses included in the first area and the logical addresses from being valid, the first mapping being defined by a first calculation equation for calculating a third address, which is a real address, based on a first start point address that is a start point address for address calculating, a second start point address that is a start point address of the second area, and the first address, the first process including updating the second start point address, and storing an updated first and the updated second start point addresses into the second nonvolatile memory;

and the first process further including: in the event there is a change in the first mapping, access the third address, that is newly mapped to the original first address, wherein the third address is mapped to the original first address after being in an invalid state.

2. The memory system according to claim 1,
wherein the first mapping is defined by the first calculation equation for calculating the second address based on the first start point address, the second start point address, storage capacities of the first and second areas, and the first address.

3. The memory system according to claim 2,
wherein, when the first start point address is denoted by RAorg, the second start point address is denoted by RAgs, the first address is denoted by LA, the second address is denoted by RA, a sum of the storage capacity of the first area and the storage capacity of the second area is denoted by Nra, the storage capacity of the second area is denoted by Ngap, and mod denotes a remainder, the first calculation equation includes RA1= (RAorg+LA) mod Nra that is a second calculation equation and RA2=(RA1+Ngap) mod Nra that is a third calculation equation, RA1 being a calculation result of the second calculation equation, and RA2 being a calculation result of the third calculation equation, and wherein, in case of RA1<RAgs, the controller sets the calculation result RA1 of the second calculation equation as the translated second address RA, in case of RA1≥RAgs, the controller sets the calculation result RA2 of the third calculation equation as the translated second address RA.

4. The memory system according to claim 3, wherein, when the number of real addresses of which the mapping is validated from being invalid by the first process is denoted by Ncreep, the controller is configured to:
  calculates a second start point address RAgs2 based on a fourth calculation equation and updates the second start point address using the calculated second start point address RAgs2, the fourth calculation equation being RAgs2=(Nra+Rags1−Ncreep) mod Nra, Rags1 being a second start point address before the calculation, RAgs2 being a second start point address after the calculation; and
  when the calculated second start point address RAgs2 is wrapped around, update the first start point address using a translation result RAorg2 of a fifth calculation equation, the fifth calculation equation being RAorg2=(RAorg1+Ngap) mod Nra, RAorg1 being a first start point address before calculation, RAorg2 being a first start address after calculation.

5. The memory system according to claim 1, wherein the controller copies data stored at a real address of the first area of which the mapping is invalidated by the first process to a real address of the second area of which the mapping is validated.

6. The memory system according to claim 1, wherein, when the first command is received, the controller updates the degree of wear, and when the first command is received a plurality of number of times, the controller stores the updated degree of wear into the first nonvolatile memory or the second nonvolatile memory.

7. The memory system according to claim 1, wherein the controller counts an operating time from a first operating of the memory system, and every time when the counted operating time is increased by a certain value, the controller stores the updated degree of wear into the first nonvolatile memory or the second nonvolatile memory.

8. The memory system according to claim 1, wherein the first nonvolatile memory further includes a third area, and wherein the controller is configured to:
determine whether or not a storage area corresponding to the translated second address is defective and,
in case of being defective, substitute the translated second address with a third address inside the third area and access the substituted third address of the first nonvolatile memory.

9. The memory system according to claim 8, wherein the controller includes a substitution table representing a correspondence relation between a real address of the first area and a real address of the third area and substitutes the translated second address with the third address based on the substitution table.

10. A method of controlling a first nonvolatile memory and a second nonvolatile memory, the first nonvolatile memory including a first area associated with logical addresses designated by a host and a second area not associated with the logical addresses, the second nonvolatile memory being a device different from the first nonvolatile memory, the method comprising: receiving a first command from the host, the first command being a write request or a read request; translating a first address into a second address based on a first mapping, the first address being designated by the first command, the second address representing a real address of the first nonvolatile memory, the first mapping representing correspondence relations between the logical addresses and real addresses of the first nonvolatile memory; determining whether or not the first mapping is changed based on a degree of wear of the first nonvolatile memory and performing a first process in a case where the first mapping is changed, the first process including validating mapping between some real addresses among the real addresses included in the second area and the logical addresses from being invalid and invalidating mapping between some real addresses among the real addresses included in the first area and the logical addresses from being valid, the first mapping being defined by a first calculation equation for calculating a third address, which is a real address, based on a first start point address that is a start point address for address calculation, a second start point address that is a start point address of the second area, and the first address, the first process including updating the second start point address, and storing an updated first and the updated second start point addresses into the second nonvolatile memory;
  and the first process further including: in the event there is a change in the first mapping, access the third address, that is newly mapped to the original first address, wherein the third address is mapped to the original first address after being in an invalid state.

11. The method according to claim 10, wherein the first mapping is defined by the first calculation equation for calculating the second address based on the first start point address, the second start point address, storage capacities of the first and second areas, and the first address.

12. The method according to claim 11, when the first start point address is denoted by RAorg, the second start point address is denoted by RAgs, the first address is denoted by LA, the second address is denoted by RA, a sum of the storage capacity of the first area and the storage capacity of the second area is denoted by Nra, the storage capacity of the second area is denoted by Ngap, and mod denotes a remainder, the first calculation equation includes RA1=(RAorg+LA) mod Nra that is a second calculation equation and RA2=(RA1+Ngap) mod Nra that is a third calculation equation, RA1 being a calculation result of the second calculation equation, and RA2 being a calculation result of the third calculation equation, the method further comprising:
  in case of RA1<RAgs, setting the calculation result RA1 of the second calculation equation as the translated second address RA; and
  in case of RA1≥RAgs, setting the calculation result RA2 of the third calculation equation as the translated second address RA.

13. The method according to claim 12, further comprising:

calculating a second start point address RAgs2 based on a fourth calculation equation and updating the second start point address RAgs2 using the calculated second start point address RAgs2, the fourth calculation equation being RAgs2=(Nra+Rags1−Ncreep) mod Nra, Rags1 being a second start point address before the calculation, RAgs2 being a second start point address after the calculation, Ncreep being the number of real addresses of which the mapping is validated from being invalid by the first process: and when the calculated second start point address RAgs2 is wrapped around, updating the first start point address using a translation result RAorg2 of a fifth calculation equation the fifth calculation equation being RAorg2= (RAorg1+Ngap) mod Nra, RAorg1 being a first start point address before calculation, RAorg2 being a first start address after calculation.

14. The method according to claim 10, further comprising:

copying data stored at a real address of the first area of which the mapping is invalidated by the first process to a real address of the second area of which the mapping is validated.

15. The method according to claim 10, the method further comprising:

updating the degree of wear when the first command is received; and storing the updated degree of wear in the first nonvolatile memory or the second nonvolatile memory when the first command is received a plurality of number of times.

16. The method according to claim 11, the method further comprising:

counting an operating time from a first operating of the memory system, and storing the updated degree of wear into the first nonvolatile memory or the second nonvolatile memory every time when the counted operating time is increased by a certain value.

17. The method according to claim 10, wherein the first nonvolatile memory further includes a third area, the method further comprising:

determining whether or not a storage area corresponding to the translated second address is defective; and substituting the translated second address with a third address inside the third area and accessing the substituted third address of the first nonvolatile memory in case of being defective.

18. The method according to claim 17, wherein the translated second address is substituted with the third address based on a substitution table representing a correspondence relation between a real address of the first area and a real address of the third area.

* * * * *